US011269587B2

(12) United States Patent
Ohki et al.

(10) Patent No.: US 11,269,587 B2
(45) Date of Patent: Mar. 8, 2022

(54) INFORMATION PROCESSING APPARATUS AND INFORMATION PROCESSING METHOD

(71) Applicant: SONY CORPORATION, Tokyo (JP)

(72) Inventors: Yoshihito Ohki, Tokyo (JP); Miho Yamada, Saitama (JP); Hirotaka Tako, Kanagawa (JP); Masao Kondo, Kanagawa (JP); Yusuke Tsujita, Kanagawa (JP); Yohei Nakajima, Kanagawa (JP); Daisuke Shiono, Tokyo (JP); Masanori Matsushima, Tokyo (JP); Hiroshi Nakayama, Tokyo (JP); Seiji Suzuki, Kanagawa (JP); Yoshiyasu Kubota, Kanagawa (JP); Kenichi Yamaura, Nagano (JP)

(73) Assignee: SONY CORPORATION, Tokyo (JP)

( * ) Notice: Subject to any disclaimer, the term of this patent is extended or adjusted under 35 U.S.C. 154(b) by 11 days.

(21) Appl. No.: 16/633,644

(22) PCT Filed: Jul. 24, 2018

(86) PCT No.: PCT/JP2018/027595
§ 371 (c)(1),
(2) Date: Jan. 24, 2020

(87) PCT Pub. No.: WO2019/026678
PCT Pub. Date: Feb. 7, 2019

(65) Prior Publication Data
US 2021/0089262 A1  Mar. 25, 2021

(30) Foreign Application Priority Data

Aug. 2, 2017 (JP) .............................. JP2017-149685

(51) Int. Cl.
*G06F 3/16* (2006.01)
*E06B 9/24* (2006.01)
(Continued)

(52) U.S. Cl.
CPC ................ *G06F 3/165* (2013.01); *E06B 9/24* (2013.01); *G10K 11/1754* (2020.05);
(Continued)

(58) Field of Classification Search
CPC combination set(s) only.
See application file for complete search history.

(56) References Cited

U.S. PATENT DOCUMENTS 6,640,142 B1 * 10/2003 Wong ..................... G05B 15/02
236/49.3
2010/0240418 A1 * 9/2010 Matoba ................ G09G 3/3406
455/566

(Continued)

FOREIGN PATENT DOCUMENTS

EP         2821990 A1     1/2015
JP       2004-206698 A    7/2004

(Continued)

OTHER PUBLICATIONS

International Search Report and Written Opinion of PCT Application No. PCT/JP2018/027595, dated Sep. 25, 2018, 08 pages of ISRWO.

*Primary Examiner* — Duc Nguyen
*Assistant Examiner* — Assad Mohammed
(74) *Attorney, Agent, or Firm* — Chip Law Group (57) ABSTRACT

The present disclosure relates to an information processing apparatus and an information processing method as well as a program that make it possible to control, by a partition provided on a boundary between two spaces, a visual shielding property and an auditory shielding property of a (Continued)

first space to a person in a second space in an interlocking relationship with each other in response to a distance between the person in the second space and the partition. A distance between the partition, which partitions the first space and the second space, and a person in the second space is measured, and transmittance of the partition and magnitude of output of audio in the first space to the second space are controlled in response to the measured distance. The present disclosure can be applied to a control apparatus for a partition section.

12 Claims, 8 Drawing Sheets (51) Int. Cl.
 G10K 15/08 (2006.01)
 H04R 1/08 (2006.01)
 G10K 11/175 (2006.01)

(52) U.S. Cl.
 CPC .............. *G10K 15/08* (2013.01); *H04R 1/08* (2013.01); *E06B 2009/2417* (2013.01); *G10K 11/175* (2013.01)

(56) References Cited

U.S. PATENT DOCUMENTS

| 2014/0204023 | A1* | 7/2014 | Kumar | G09G 3/20 345/156 |
| 2016/0163302 | A1* | 6/2016 | Klabunde | G01H 3/10 381/56 |
| 2016/0301373 | A1* | 10/2016 | Herman | G08B 3/10 |
| 2018/0033171 | A1* | 2/2018 | Rakshit | G06K 9/00624 |

FOREIGN PATENT DOCUMENTS

| JP | 2007-061446 A | 3/2007 |
| JP | 2016-533524 A | 10/2016 |
| WO | 2013/068322 A1 | 5/2013 |
| WO | 2015/000751 A1 | 1/2015 |
| WO | 2017/098772 A1 | 6/2017 |

\* cited by examiner

FIG. 8

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/027595 filed on Jul. 24, 2018, which claims priority benefit of Japanese Patent Application No. JP 2017-149685 filed in the Japan Patent Office on Aug. 2, 2017. Each of the above-referenced applications is hereby incorporated herein by reference in its entirety.

TECHNICAL FIELD

The present disclosure relates to an information processing apparatus and an information processing method as well as a program, and particularly to an information processing apparatus and an information processing method as well as a program by which a visual shielding property and an auditory shielding property are interlocked with each other in response to a distance from a partition.

BACKGROUND ART

A technology is proposed in which a partition including a panel that can control light is provided on a boundary between two spaces such that the panel on a gaze of a person in one space to an object, which is in the other space and is not desirable to be shown to the person in the one space, is shaded to prevent only the object, which is not desirable to be shown, from being shown while maintaining a sense of openness in the mutual spaces (refer to PTL 1).

CITATION LIST

Patent Literature

[PTL 1]
PCT Patent Publication No. 2013/068322

SUMMARY

Technical Problem

However, in the technology disclosed in PTL 1, although visual shielding that prevents an object, which is in the other space and is not desirable to be shown to a person in one space, from being shown can be implemented, for example, conversation of persons in the other space or the like is heard by the person in the one space.

The present disclosure has been made in view of such a situation as described above and particularly contemplates implementation, by a partition provided on a boundary between two spaces, of a visual shielding property and an auditory shielding property in an interlocking relationship with each other in response to a distance between a person and the partition.

Solution to Problem

An information processing apparatus of one aspect of the present disclosure is an information processing apparatus including a distance measurement section that measures a distance between a person in a second space and a partition, in which a first space and the second space are partitioned by the partition, and a control section that controls visual and auditory shielding properties of the partition in response to the distance measured by the distance measurement section.

The information processing apparatus can be configured such that the control section includes a transmittance controlling section that controls light transmittance of the partition in response to the distance measured by the distance measurement section, and an audio controlling section that controls audio to output audio in the first space to the second space in response to the distance measured by the distance measurement section.

The information processing apparatus can be configured such that the partition includes light controlling glass; the information processing apparatus further includes an actuator that is configured so as to be connected to the partition and vibrates the partition to output audio; the control section sets a distance coefficient in response to the distance measured by the distance measurement section; the transmittance controlling section controls, in response to the distance coefficient, light transmittance of the light controlling glass that configures the partition; and the audio controlling section vibrates the partition through the actuator in response to the distance coefficient to output audio in the first space to the second space.

The information processing apparatus can be configured such that the control section controls the distance coefficient to 1 where the distance measured by the distance measurement section is shorter than a first distance, sets the distance coefficient to a value between 0 and 1 in response to the distance where the distance measured by the distance measurement section is an intermediate distance between a second distance longer than the first distance and the first distance, and sets the distance coefficient to 0 where the distance measured by the distance measurement section is longer than the second distance.

The information processing apparatus can be configured such that the transmittance controlling section controls, by a value obtained by multiplying predetermined transmittance by the distance coefficient, light transmittance of the light controlling glass that configures the partition.

The information processing apparatus can be configured such that it further includes a microphone that receives audio in the first space and outputs the audio as an audio signal, and a storage section that stores an audio signal including background sound, and that the audio controlling section sets an audio mixing ratio in response to the distance coefficient, mixes an audio signal of audio in the first space received by the microphone and an audio signal including the background sound with each other with the audio mixing ratio to generate an audio signal including mixed audio, and controls the partition to vibrate on the basis of the audio signal of the mixed audio to output the mixed audio to the second space.

The information processing apparatus can be configured such that the audio controlling section mixes the audio signal of the audio in the first space received by the microphone and the audio signal including the background sound with each other on the basis of the audio mixing ratio to generate an audio signal including mixed audio, and controls the partition to vibrate on the basis of the audio signal of the mixed audio to output the mixed audio to the second space.

The information processing apparatus can be configured such that the audio controlling section controls, when the audio mixing ratio is lower than a predetermined value, the actuator to generate vibration of an opposite phase corresponding to the audio signal of the mixed audio and controls, when the audio mixing ratio is higher than the predetermined value, the actuator to generate vibration of a same phase corresponding to the audio signal of the mixed audio.

The information processing apparatus can be configured such that the background sound is silence.

The information processing apparatus can be configured such that it further includes a reverb filter that adds reverberation in response to the distance coefficient to the audio signal of the audio received by the microphone.

The information processing apparatus can be configured such that the reverb filter mixes, by a sum product according to the distance coefficient, a processing result by a filter that adds reverberation according to the first space to the audio signal of the audio received by the microphone and a processing result by a filter that adds reverberation according to a space including both the first space and the second space to the audio signal of the audio received by the microphone, to add reverberation in response to the distance coefficient to the audio signal of the audio received by the microphone.

A control method for an information processing apparatus of one aspect of the present disclosure is a control method for an information processing apparatus including a distance measurement section that measures a distance between a person in a second space and a partition, in which a first space and the second space are partitioned by the partition, and a control method for an information processing apparatus including a controlling process for controlling visual and auditory shielding properties of the partition in response to the distance measured by the distance measurement section.

A program of one aspect of the present disclosure is a program for causing a computer to execute process including a distance measurement process for measuring a distance between a person in a second space and a partition, in which a first space and the second space are partitioned by the partition, and a controlling process for controlling visual and auditory shielding properties of the partition in response to the distance measured by the distance measurement section.

In the one aspect of the present disclosure, the visual and auditory shielding properties of the partition that partitions the first space and the second space are controlled in response to the distance between the person in the second space and the partition.

Advantageous Effect of Invention

According to the one aspect of the present disclosure, by the partition provided on the boundary between the two spaces, it becomes possible to interlock the visual shielding property and the auditory shielding property with each other in response to the distance between the person and the partition.

DESCRIPTION OF EMBODIMENT

In the following, a preferred embodiment of the present disclosure is described in detail with reference to the accompanying drawings. It is to be noted that, in the present specification and the drawings, components having substantially same functional configurations are denoted by identical reference signs and overlapping description of them is omitted.

Further, description is given in the following order.
1. Example of Appearance Configuration of Information Processing Apparatus That Controls Partition Section
2. Example of Configuration Relating to Functions Implemented by Information Processing Apparatus That Controls Partition Section
3. Controlling Process of Partition Section by Information Processing Apparatus of FIG. 2
4. Modifications
5. Controlling Process of Partition Section by Information Processing Apparatus of FIG. 6
6. Example Executed by Software <1. Example of Appearance Configuration of Information Processing Apparatus that Controls Partition Section>

Figure 1:
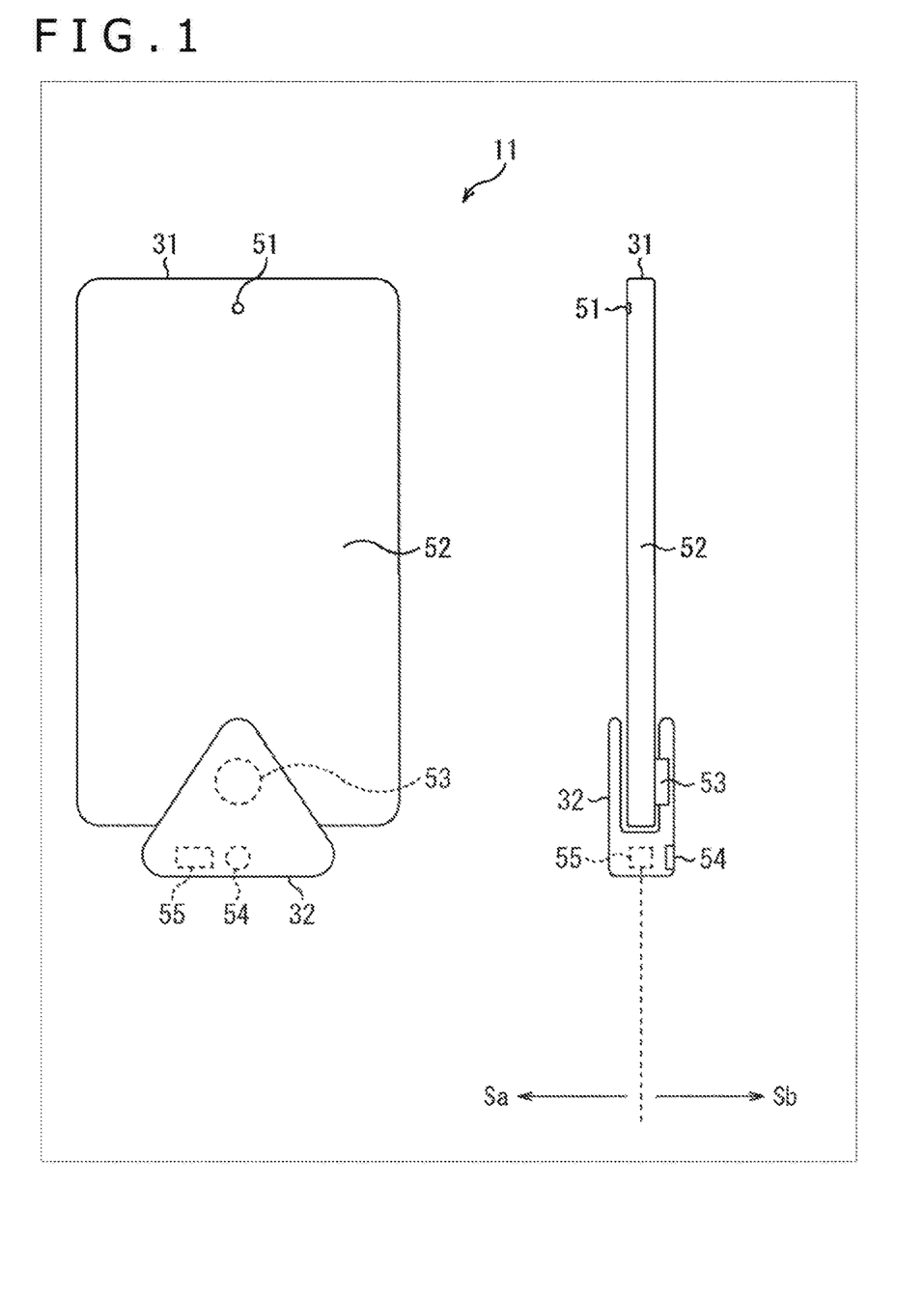
FIG. 1 is a view depicting an example of an appearance configuration of an information processing apparatus that controls a partition section according to the present disclosure.

FIG. 1 depicts an example of an appearance configuration of an information processing apparatus that controls a partition section according to the present disclosure. It is to be noted that a left portion of FIG. 1 depicts a main body front elevational view and a right portion of FIG. 1 depicts a main body side elevational view.

An information processing apparatus 11 has an integrated configuration of a partition section 31 and a pedestal section 32 and is placed on a flat face at the pedestal section 32 thereof.

The partition section 31 includes a microphone 51 and light controlling glass 52. Meanwhile, the pedestal section 32 includes an actuator 53, a distance measurement sensor 54 and a control section 55.

The partition section 31 is fixed to the pedestal section 32 through the actuator 53 that is inserted in an opening so as to be directed upwardly of the pedestal section 32 and that is connected and fixed to the pedestal section 32 and the partition section 31.

The partition section 31 includes the light controlling glass 52 and has transmittance controlled by the control section 55 provided on the pedestal section 82 such that it is placed into a light-shielding state when the transmittance is controlled to a low state but is placed into a light-transmitting state when the transmittance is controlled to a high state.

Accordingly, in a case where the partition section 31 divides a left side space Sa and a right side space Sb at the right portion of FIG. 1 as depicted in FIG. 1, a state in which a person existing in the space Sb can view the inside of the space Sa through the partition section 31 changes in response to the transmission state.

The microphone 51 converts sound inputted in the left side space Sa at the left portion of FIG. 1 with respect to the partition section 31 into a sound signal and outputs the sound signal to the control section 55. It is to be noted that, since it is sufficient if the microphone 51 can input sound in the space Sa, it may be provided at a position other than that of the partition section 31, and therefore, the space Sa may be made a remote place such that, for example, environmental sound in outdoors partitioned by the partition section 31 such as sound like river's murmur or bird tweet is inputted.

The actuator 53 is provided in connection to the partition section 31 and is controlled by the control section 55 such that it vibrates the entire partition section 31 in a corresponding relationship to a sound signal outputted from the microphone 51 to generate sound in the right side space Sb at the right portion of FIG. 1 with respect to the partition section 31.

The distance measurement sensor 54 measures a distance from the partition section 31 to a person in the right side space Sb in FIG. 1 with respect to the partition section 31, using, for example, an ultrasonic wave and outputs the distance to the control section 55.

The control section 55 controls overall operation of the information processing apparatus 11. The control section 55 adjusts transmittance of the light controlling glass 52 in response to the distance from the partition section 31 to the person in the space Sb at the right portion of FIG. 1, which is supplied from the distance measurement sensor 54, and adjusts sound to be generated by controlling the vibration of the actuator 53. It is to be noted that, in the description of the present specification, the term sound includes general sound called sound and audio generated by vibration of air such as a voice of a person, music and environmental sound.

<2. Example of Configuration Relating to Functions Implemented by Information Processing Apparatus that Controls Partition Section>

Now, an example of a configuration relating to functions implemented by the information processing apparatus 11 is described with reference to a block diagram of FIG. 2. It is to be noted that the components described with reference to FIG. 1 are denoted by identical reference signs, and description of them is suitably omitted.

In particular, the information processing apparatus 11 includes the microphone 51, the light controlling glass 52, the actuator 53, the distance measurement sensor 54, and the control section 55 described hereinabove with reference to FIG. 1.

Further, the control section 55 includes a distance coefficient setting section 71, a transmittance determination section 72, a light controlling section 73, a sound mixing ratio determination section 74, an actuator controlling section 75, an ALC (Automatic Level Controller) 76, and a storage section 77.

The distance coefficient setting section 71 sets a distance coefficient K on the basis of the distance from the partition section 31 to the person in the right side space Sb at the right portion of FIG. 1 with respect to the partition section 31, which is supplied from the distance measurement sensor 54, and supplies the distance coefficient K to the transmittance determination section 72 and the sound mixing ratio determination section 74.

Figure 3:
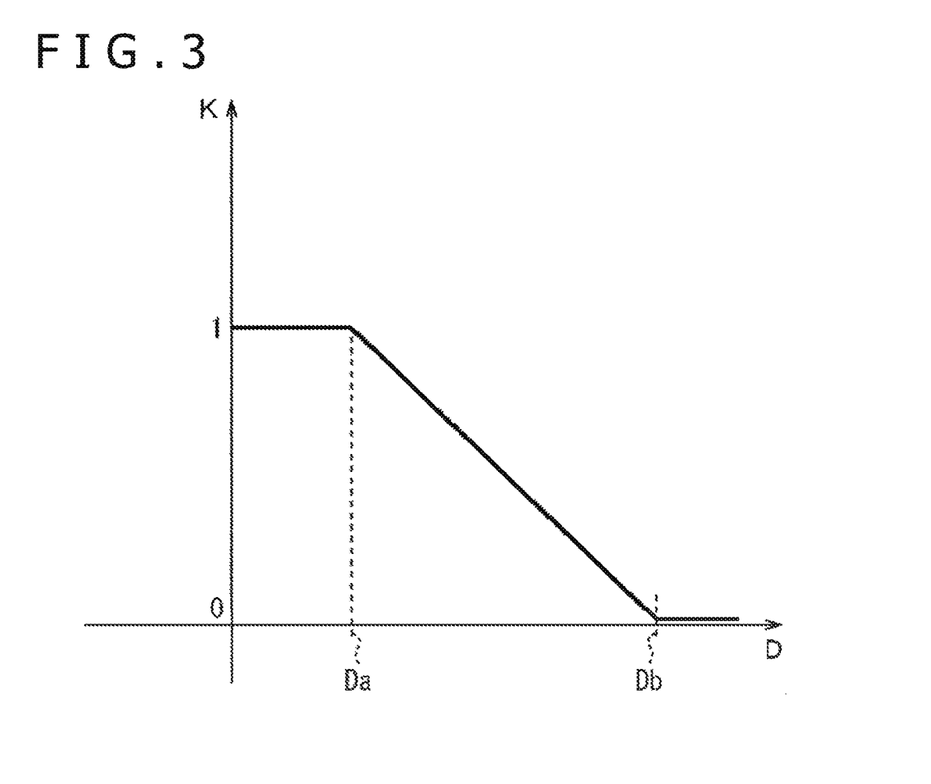
FIG. 3 is a view illustrating a distance coefficient.

The distance coefficient K is a coefficient from 0 to 1 set in response to a distance D from the partition section 31 to the person as indicated, for example, in FIG. 3. In FIG. 3, when the distance D is smaller than Da, the distance coefficient K is set to 1, but in the case where the distance D ranges from Da to Db (Db>Da), the distance coefficient K is set to a value according to the distance D ($K=1-(D-Da)/(Db-Da)$), and when the distance D is greater than Db, the distance coefficient K is 0.

In other words, as the distance D from the partition section 31 to the person decreases, the distance coefficient K increases, and as the distance D increases, the distance coefficient K decreases.

The transmittance determination section 72 determines transmittance Kt on the basis of the distance coefficient K and outputs the transmittance Kt to the light controlling section 73. The transmittance Kt is defined, for example, by the following expression (1).

$$Kt = Kta \times K \qquad (1)$$

Here, Kta is predetermined transmittance (0 to 1) that is a maximum value of the transmittance, and K is a distance coefficient. In particular, since the predetermined transmittance Kta may be 1, the transmittance Kt may be the distance coefficient K itself.

The light controlling section 73 controls the transmittance of the light controlling glass 52 in response to the transmittance Kt supplied from the transmittance determination section 72.

The sound mixing ratio determination section 74 determines a sound mixing ratio Ks on the basis of the distance coefficient K and outputs the sound mixing ratio Ks to the actuator controlling section 75. The sound mixing ratio Ks is defined, for example, by the following expression (2).

$$Ks = Ksa \times K \qquad (2)$$

Here, Ksa is a predetermined sound mixing ratio (0 to 1) that is a maximum value of the sound mixing ratio, and K is a distance coefficient. In particular, since the predetermined sound mixing ratio Ksa may be 1, the sound mixing ratio Ks may be the distance coefficient K itself.

The ALC 76 adjusts level of a sound signal supplied from the microphone 51 and supplies a resulting sound signal to the actuator controlling section 75.

The storage section 77 includes, for example, a semiconductor memory and the like and stores therein data for configuring a sound signal including background sound such as music that becomes BGM (Back Ground Music), and the data configuring the stored sound signal is read out by the actuator controlling section 75.

The actuator controlling section 75 mixes a sound signal Sv that is supplied from the ALC 76 and includes, for example, spatial sound in the space Sa such as sound like river's murmur or bird tweet at a remote place or environmental sound in outdoors and a sound signal Se including background sound stored in the storage section 77 by performing an arithmetic operation, for example, in accordance with the following expression (3) on the basis of the sound mixing ratio Ks supplied from the sound mixing ratio determination section 74 to generate a sound signal Sm including mixed sound. Then, the actuator controlling section 75 controls the actuator 53 to vibrate in a corresponding relationship to the sound signal Sm of the mixed sound to vibrate the partition section 31 such that mixed sound is generated with respect to the space Sb.

$$Sm = Sv \times Ks + Se \times (1-Ks) \qquad (3)$$

Here, Sm is the sound signal of the mixed sound; SV is the sound signal in the space Sa in FIG. 1, which is received by the microphone 51 and to which ALC is applied; Se is the sound signal of the background sound stored in the storage section 77; and Ks is the sound mixing ratio.

In particular, the actuator controlling section 75 mixes the background sound and the spatial sound in the space Sa on the basis of the sound mixing ratio Ks supplied from the sound mixing ratio determination section 74 and controls the actuator 53 to generate vibration corresponding to the mixed sound to vibrate the partition section 31 such that the mixed sound is outputted to the space Sb.

In short, the transmittance of the light controlling glass 52 and the sound mixing ratio between the background sound and the spatial sound in the space Sa change in response to the distance between the person in the space Sb and the partition section 31 in FIG. 1.

Figure 4:
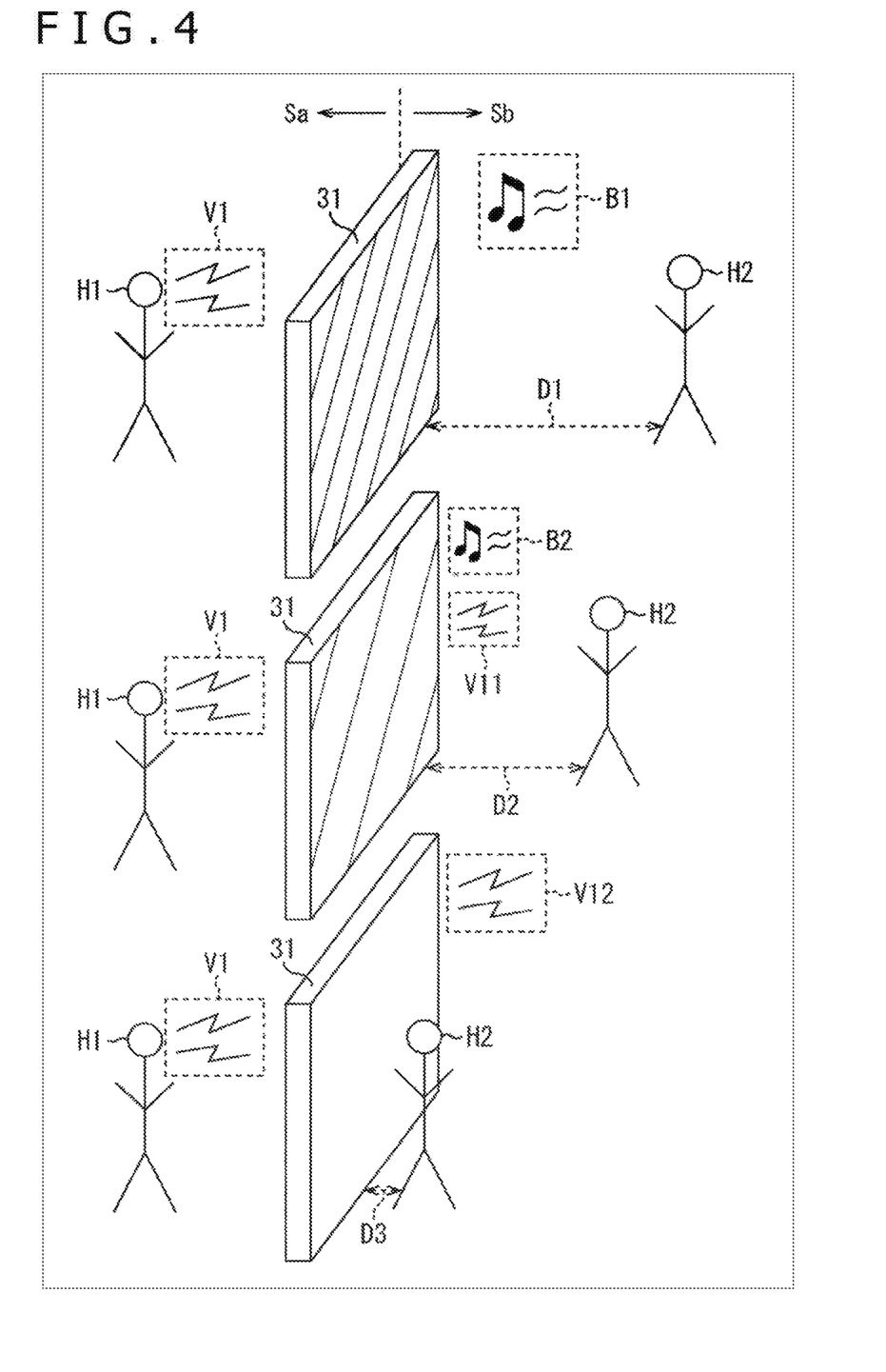
FIG. 4 is a view illustrating operation according to a distance between the information processing apparatus and a person.

More particularly, it is assumed that, for example, as depicted at the highest stage in FIG. 4, a person H1 exists in the space Sa and a person H2 exists at a distance D1, which is greater than the distance Db in FIG. 3 from the partition section 31, in the space Sb.

In the case of the highest stage in FIG. 4, since the distance coefficient K becomes 0, the transmittance Kt becomes 0, and the light controlling glass 52 is placed into a fully light shielding state. As a result, the person H2 existing in the space Sb cannot view the person H1 in the space Sa through the partition section 31.

At this time, in a case where sound V1 is generated by utterance of the person H1 or the like in the space Sa, since the distance coefficient K is 0, the sound mixing ratio Ks is 0, and the mixed sound comes to include only the sound signal Se of the background sound. Thus, the actuator 53 vibrates only with the sound signal of the background sound to vibrate the partition section 31, and consequently, only the sound of background sound B1 is outputted to the space Sb.

Further, it is assumed that, as depicted at the middle stage in FIG. 4, the person H1 exists in the space Sa and the person H2 exists at a distance D2, which is greater than the distance Da in FIG. 3 from the partition section 31 but is smaller than the distance Db, in the space Sb.

In the case of the middle stage in FIG. 4, since the distance coefficient K changes between 0 to 1 in response to the distance, if the predetermined transmittance Kta is 1, then the transmittance Kt becomes 0 to 1 and the light controlling glass 52 is placed into a light shielding state according to the distance of the person H2 from the partition section 31.

In particular, as the person H2 existing in the space Sb comes nearer to the partition section 31, the transmittance increases, and the person H2 is placed into a state in which it is easy to view the person H1 in the space Sa through the partition section 31.

At this time, in the case where sound V1 is generated by utterance of the person H1 or the like in the space Sa, since the distance coefficient K changes between 0 to 1 in response to the distance of the person H2 from the partition section 31, the sound mixing ratio Ks becomes 0 to 1, and in the mixed sound, the ratio of spatial sound V11 in the space Sa increases and the ratio of background sound B2 decreases as the person H2 comes nearer to the partition section 31.

In short, if the distance D2 becomes a distance shorter than the distance Db, i.e., as the person H2 comes nearer to the partition section 31, in the mixed sound emitted to the space Sb, the ratio of the spatial sound V11 in the space Sa increases, and further, when the distance D2 becomes the distance Da, the ratio of the background sound B2 becomes 0 and the mixed sound comes to include only the spatial sound in the space Sa.

Furthermore, it is assumed that, for example, as depicted at the lowermost stage in FIG. 4, the person H1 exists in the space Sa and the person H2 exists at a distance D3, which is smaller than the distance Da in FIG. 3 from the partition section 31, in the space Sb.

In the case of the lowermost stage in FIG. 4, since the distance coefficient K becomes 1, the transmittance Kt becomes 1 and the light controlling glass 52 is placed into a fully transmitting state. As a result, the person H2 existing in the space Sb is placed into a state in which the person H2 can view the person H1 in the space Sa through the partition section 31.

At this time, in the case where sound V1 is generated by utterance of the person H1 or the like in the space Sa, since the distance coefficient K becomes 1, the sound mixing ratio Ks becomes 1, and the mixed sound comes to include only the spatial sound in the space Sa. Thus, the actuator 53 vibrates only with the spatial sound in the space Sa to vibrate the partition section 31 such that only spatial sound V12 (=V1) in the space Sa is outputted to the space Sb.

In particular, as the person H2 in the space Sb is spaced away from the partition section 31, the partition section 31 is placed into a light shielding state and a state in which the background sound can be heard (the spatial sound in the space Sa cannot be heard). On the contrary, as the person H2 in the space Sb comes nearer to the partition section 31, the partition section 31 is placed into a light transmitting state and a state in which the spatial sound in the space Sa can be heard (the background sound cannot be heard).

Accordingly, a visual shielding property and an auditory shielding property in regard to a manner of the person H1 in the space Sa through the partition section 31 can be interlocked with each other in response to the distance from the person H2 in the space Sb to the partition section 31.

<3. Controlling Process of Partition Section by Information Processing Apparatus of FIG. 2>

Figure 2:
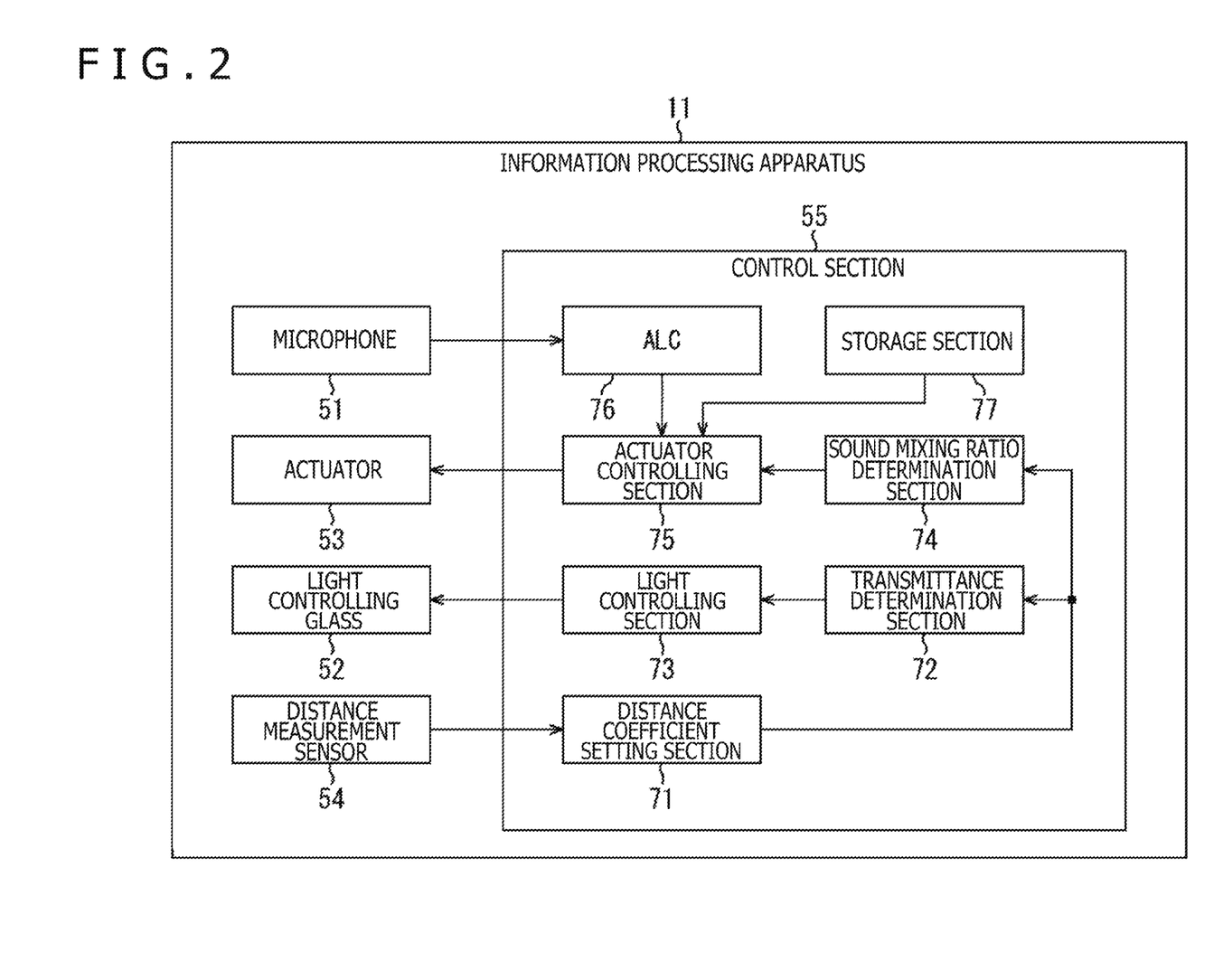
FIG. 2 is a block diagram depicting an example of a configuration relating to functions implemented by the information processing apparatus of FIG. 1.
Figure 5:
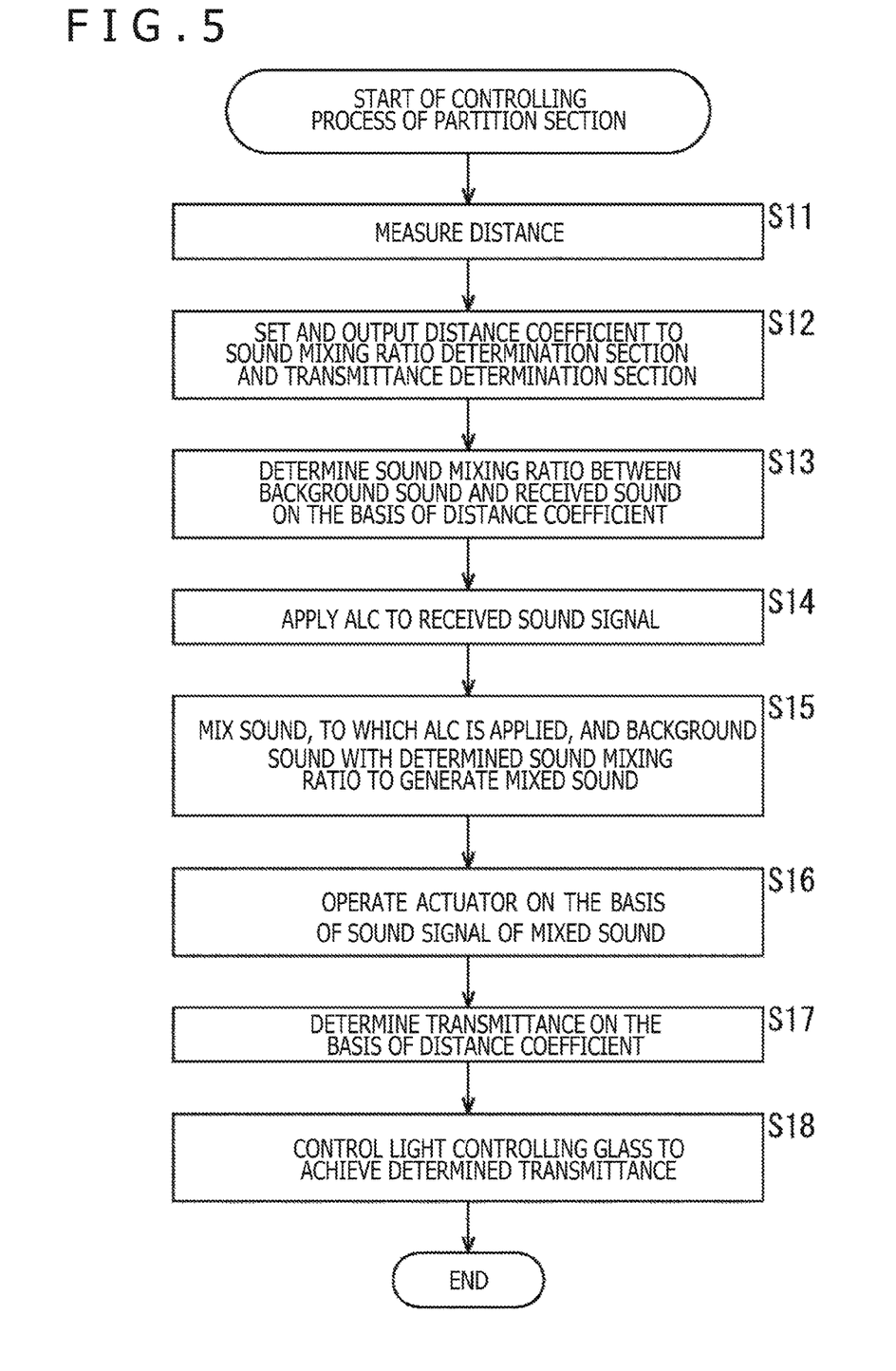
FIG. 5 is a flow chart illustrating a controlling process by the information processing apparatus of FIG. 2.

Now, a controlling process of the partition section 31 by the information processing apparatus of FIG. 2 is described with reference to a flow chart of FIG. 5.

In step S11, the distance measurement sensor 54 measures the distance from the partition section 31 to the person H2 in the space Sb and outputs the distance to the control section 55.

In step S12, the distance coefficient setting section 71 of the control section 55 acquires a measurement result of the distance supplied from the distance measurement sensor 54, sets a distance coefficient K, and then supplies the distance coefficient K to the transmittance determination section 72 and the sound mixing ratio determination section 74.

In step S13, the sound mixing ratio determination section 74 arithmetically operates the abovementioned expression (2) on the basis of the distance coefficient K to determine a sound mixing ratio Ks between the background sound and the sound signal received by the microphone 51 and outputs the sound mixing ratio Ks to the actuator controlling section 75.

In step S14, the ALC 76 applies ALC to the sound signal based on the sound received by the microphone 51 and outputs a resulting sound signal to the actuator controlling section 75.

In step S15, the actuator controlling section 75 reads out a sound signal Se of the background sound stored in the storage section 77, and on the basis of the sound mixing ratio Ks and by the abovementioned expression (3), mixes the sound signal Se with a sound signal Sv received by the microphone 51 and to which ALC is applied, to generate a sound signal Sm of the mixed sound.

In step S16, the actuator controlling section 75 controls the actuator 53 to vibrate on the basis of the sound signal Sm of the mixed sound. As a result, the mixed sound is outputted to the space Sb from the partition section 31 including the light controlling glass 52 connected to the actuator 53.

In step S17, the transmittance determination section 72 arithmetically operates the abovementioned expression (1) on the basis of the distance coefficient K to determine a transmittance Kt and outputs the determined transmittance Kt to the light controlling section 73.

In step S18, the light controlling section 73 controls the transmittance of the light controlling glass 52 on the basis of the determined transmittance Kt.

By the processes described above, a visual shielding property and an auditory shielding property in regard to a manner of the person H1 in the space Sa through the partition section 31 can be interlocked with each other in response to the distance from the person H2 in the space Sb to the partition section 31.

In particular, in such a situation where a case in which it is desired to connect two spaces to each other to utilize them as a single space according to circumstances like, for example, a living room and a dining room or meeting spaces and another case in which such two spaces are intentionally separated from each other such that viewing and hearing between them are disabled or viewing and hearing between them are enabled exist in a mixed manner, it becomes possible to dynamically and simultaneously change over a degree of a visual shielding property and a degree of auditory shielding property in response to the distance between the person H2 in the space Sb and the partition section 31.

Further, by interlocking a movement of coming near to the partition section 31 with a visual shielding property and an auditory shielding property, intuitive changeover becomes possible.

Further, by interlocking an auditory shielding property and a visual shielding property with each other, it becomes possible to cause users to intuitively recognize to which degree they are shielded at present.

It is to be noted that, although the foregoing description is directed to an example in which a sound signal Sv of spatial sound uttered by the person H1 in the space Sa and a sound signal Se of background sound are mixed on the basis of the sound mixing ratio Ks, the background sound may be made, for example, silence, and if the background sound is made silence, then only the magnitude of the sound signal Sv comes to be adjusted. Therefore, this may be used for adjustment of the volume of spatial sound according to the distance between the person H2 in the space Sb and the partition section 31.

Further, as the sound mixing ratio Ks becomes lower than a predetermined value (for example, ½) and comes closer to 0, vibration of a phase opposite to that of the sound signal Sv may be generated by an increasing magnitude by the actuator 53 to generate sound in the space Sb to cancel the sound V1 in the space Sa. On the contrary, as the sound mixing ratio Ks becomes, for example, higher than a predetermined value (for example, ½) and comes nearer to 1, vibration of a phase same as that of the sound signal Sv may be generated by an increasing magnitude by the actuator 53.

This makes it possible to place, when the person H2 is spaced from the partition section 31 by a distance greater than a predetermined distance, the sound in the space Sa into a state in which the sound can be heard less in the space Sb. On the contrary, when the person H2 comes nearer to the partition section 31 by more than the predetermined distance, it is possible to cause sound in the space Sa to be outputted as sound of an increasing sound volume.

As a result, a visual shielding property and an auditory shielding property in regard to a manner of the person H1 in the space Sa through the partition section 31 can be recognized in an interlocked relationship with each other in response to the distance from the person H2 in the space Sb to the partition section 31.

Further, in place of the sound mixing ratio Ks that interlocks with the transmittance Kt according to the distance coefficient K, for example, not only sound volume but also strength of a filter for emphasizing or removing sound in a specific range may be adjusted.

Furthermore, as the sound to be inputted to the microphone 51, sound received by the microphone 51 located not only in the space Sa physically neighboring the space Sb but also at a remote place such as, for example, a remote house or a remote office may be used.

Further, adjustment of the transmittance Kt may be performed not only in response to the distance of the person H2 to the partition section 31 but also by a controller such as a dial, a smartphone or the like.

<4. Modifications>

The foregoing description is directed to an example in which sound in the space Sa is received by the microphone 51, converted into a sound signal and then subjected to application of ALC, whereafter it is mixed with background sound in response to a sound mixing ratio Ks, and then the partition section 31 is vibrated by the actuator 53 such that the sound signal is outputted as sound. However, a reverb filer according to the distance coefficient K may be applied to the sound signal to which ALC has been applied such that reverberation according to a shielding property is generated.

Figure 6:
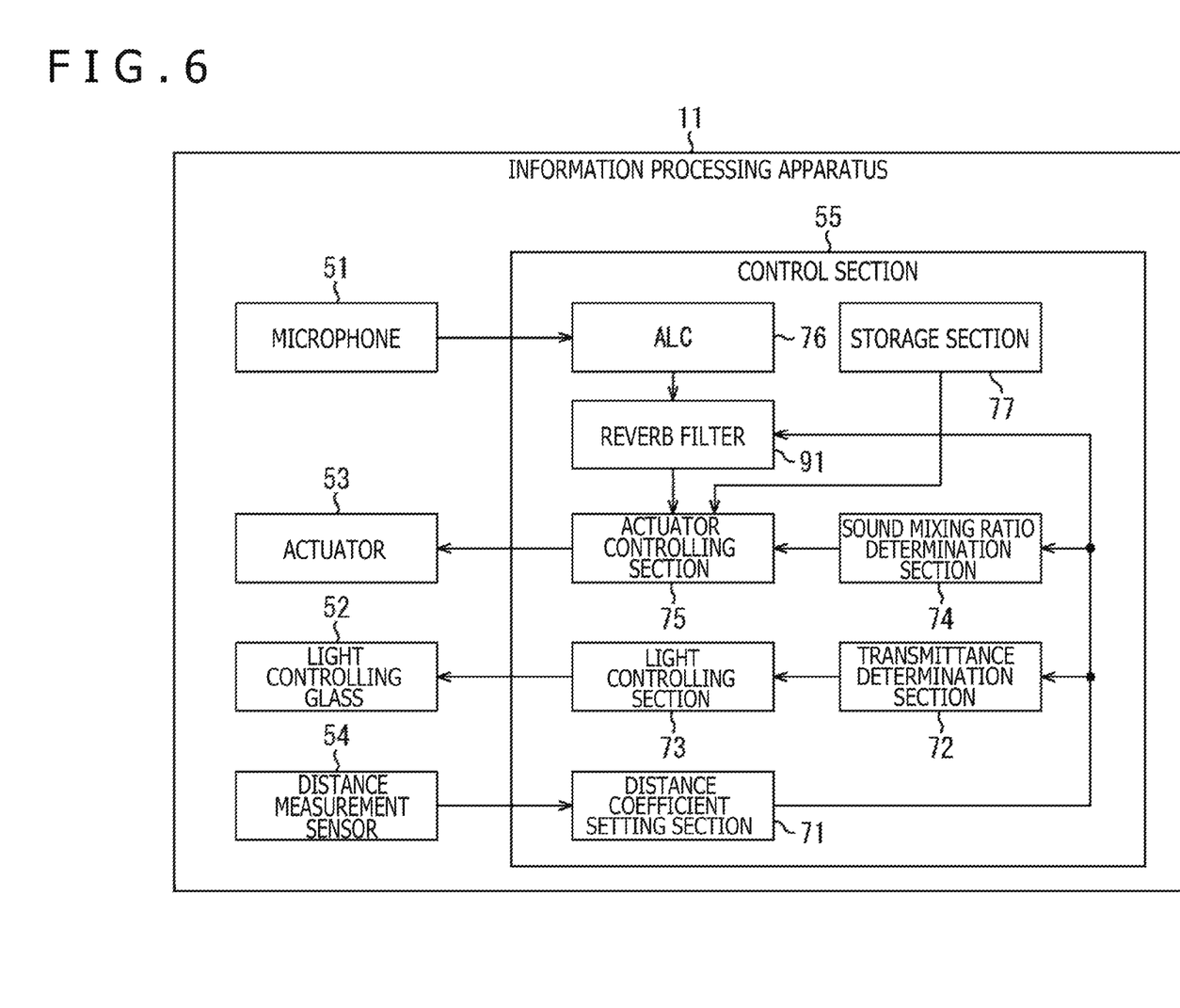
FIG. 6 is a block diagram depicting an example of a configuration of a modification of the information processing apparatus of FIG. 1.

FIG. 6 is a block diagram depicting a functional configuration of an information processing apparatus 11 that applies a reverb filter according to a distance coefficient K to a sound signal to which ALC is applied. It is to be noted that, in the information processing apparatus 11 of FIG. 6, components having functions same as those of the information processing apparatus 11 of FIG. 2 are denoted by identical reference signs, and description of them is suitably omitted.

In particular, the difference of the information processing apparatus 11 of FIG. 6 from the information processing apparatus 11 of FIG. 2 is that a reverb filter 91 is provided between the ALC 76 and the actuator controlling section 75.

The reverb filter 91 is a filter for adding reverberation based on the distance coefficient K to sound to which ALC is applied. In particular, the reverb filter 91 adds reverberation to a sound signal of sound, to which ALC is applied, with a strength according to a distance coefficient K supplied from the distance coefficient setting section 71 and outputs a resulting sound signal to the actuator controlling section 75.

More particularly, for example, on the basis of the distance coefficient K and by an arithmetic operation indicated by the following expression (4), the reverb filter 91 applies a reverb filter to a sound signal Sv in the space Sa in FIG. 1, which is received by the microphone 51 and to which ALC is applied.

$$Fr(S) \times Sv = \{Fr(Sa+Sb) \times K + Fr(Sa) \times (1-K)\} \times Sv \qquad (4)$$

Here, K is a distance coefficient; $Fr(Sa+Sb)$ is a reverb filter that is lowest in shielding property by the partition section 31 and corresponds to a breadth and a shape of an integrated space of the spaces Sa and Sb; $Fr(Sa)$ is a reverb filter that is highest in shielding property by the partition section 31 and in which the space to be considered corresponds to a breadth and a shape of the space Sa alone; and Fr(S) is a reverb filter to be applied to a sound signal Sv, to which ALC is applied, in response to the distance coefficient.

In particular, the reverb filter 91 applies a filter for adding a sound signal of reverberation according to the breadth and the shape of the space of the space Sa alone to the sound signal Sv of spatial sound in the space Sa received by the microphone 51 to which ALC is applied, as the distance between the person H2 and the partition section 31 increases and the distance coefficient K has a value nearer to zero.

Further, the reverb filter 91 applies a filter for adding a sound signal of reverberation according to the breadth and the shape of the space in which the space Sa and the space Sb are connected to the sound signal Sv of the spatial sound in the space Sa received by the microphone 51 to which ALC is applied, as the distance between the person H2 and the partition section 31 decreases and the distance coefficient K has a value closer to 1.

By such processes as described above, in a case where the visual shielding property and the auditory shielding property are high, since the space Sa is a space having a high shielding property, sound to be heard by the person H2 becomes sound to which reverberation generated in the space of the breadth and the shape of the space Sa is added. In contrast, in a case where the visual shielding property and the auditory shielding property are low, since the space Sb in which the person H2 exists and the space Sa become such a space of a low shielding property in which they are virtually connected to each other, the sound to be heard by the person H2 is sound to which reverberation generated in the space of the totaling breadth and shape of the spaces Sa and Sb is added.

Therefore, assuming a shielding property of the space Sa in response to the distance coefficient K, the reverb filter 91 adds reverberation corresponding to the breadth and the shape of the space according to the assumed shielding property of the space Sa. In short, in a case where the shielding property of the space Sa is highest, reverberation corresponding to the breadth and the shape of the space Sa alone is added, and in a case where the shielding property of the space Sa is lowest, reverberation corresponding to the breadth and the shape of the space where the spaces Sa and Sb are connected to each other is added. Further, in a case where the shielding property of the space Sa is a middle level, reverberation determined by the sum product using the distance coefficient K from reverberation corresponding to the breadth and the shape of the space Sa alone and reverberation corresponding to the breadth and the shape of the spaces Sa and Sb is added.

The actuator controlling section 75 mixes the sound signal of the spatial sound in the space Sa, which is received by the microphone 51 and to which reverberation is added and ALC is applied, and the sound signal of the background sound on the basis of the sound mixing ratio Ks to generate mixed sound and controls the actuator 53 to vibrate on the basis a sound signal of the generated mixed sound. The partition section 31 is vibrated by the actuator 53 to output mixed sound to the space Sb.

At this time, to the sound received by the microphone 51 and included in the mixed sound, a reverb filter is applied with strength according to the distance coefficient K set on the basis of the distance from the person H2 in the space Sb to the partition section 31. Therefore, as the person H2 comes nearer to the partition section 31, the visual shielding property and the auditory shielding property decrease.

Further, to the mixed sound, reverberation in such a wide space as is formed by connection of the spaces Sa and Sb is added by the reverb filter 91. Consequently, the person H2 can auditorily recognize such a space as is virtually formed from the spaces Sa and Sb connected to each other.

As a result, it becomes possible to cause the person H2 to dynamically and simultaneously recognize the visual shielding property and the auditory shielding property in response to the distance between the person H2 and the partition section 31, and by a change of reverberation generated by the reverb filter 91, it becomes possible to cause the person H2 to recognize such that the space Sa is a space shielded from and independent of the space Sb or to recognize that the space Sa is a space connected to Sb.

<5. Controlling Process of Partition Section by Information Processing Apparatus of FIG. 6>

Figure 7:
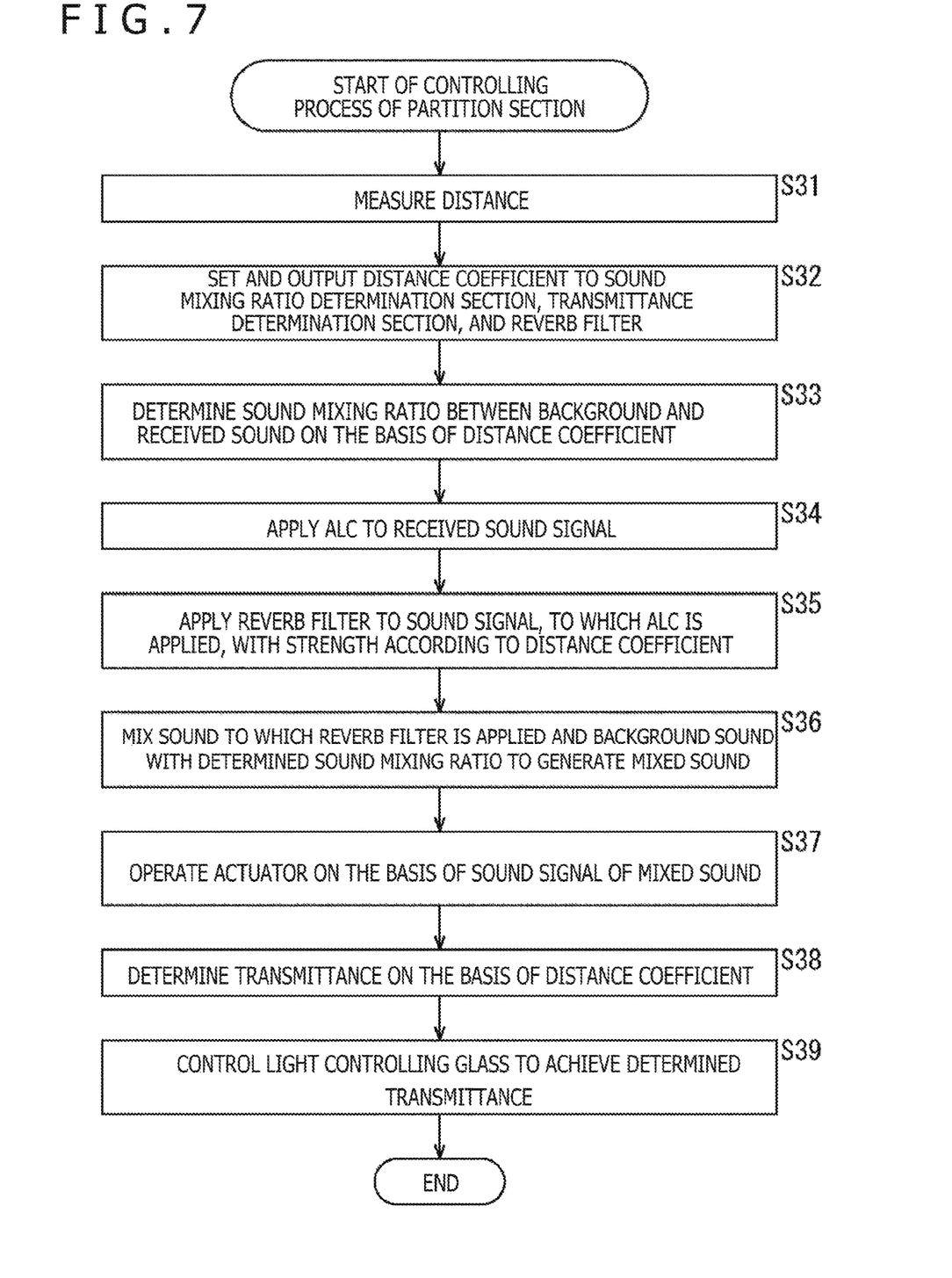
FIG. 7 is a flow chart illustrating a controlling process by the information processing apparatus of FIG. 5.

Now, a controlling process of the partition section 31 by the information processing apparatus of FIG. 6 is described with reference to a flow chart of FIG. 7.

In step S31, the distance measurement sensor 54 measures the distance from the partition section 31 to the person H2 in the space Sb and outputs the distance to the control section 55.

In step S32, the distance coefficient setting section 71 of the control section 55 acquires a measurement result of the distance supplied from the distance measurement sensor 54 to set a distance coefficient K and supplies the distance coefficient K to the transmittance determination section 72, sound mixing ratio determination section 74, and reverb filter 91.

In step S33, the sound mixing ratio determination section 74 arithmetically operates the abovementioned expression (2) on the basis of the distance coefficient K to determine a sound mixing ratio Ks between the background sound and the sound signal received by the microphone 51 and outputs the sound mixing ratio Ks to the actuator controlling section 75.

In step S34, the ALC 76 applies ALC to the sound signal based on the sound received by the microphone 51 and outputs a resulting sound signal to the reverb filter 91.

In step S35, the reverb filter 91 arithmetically operates the abovementioned expression (4) on the basis of the distance coefficient K to apply a reverb filter to the sound signal to which ALC is applied to generate a sound signal of the sound to which reverberation is added and outputs the generated sound signal to the actuator controlling section 75.

In step S36, the actuator controlling section 75 reads out the sound signal Se of the background sound stored in the storage section 77 and, on the basis of the sound mixing ratio Ks and by the abovementioned expression (3), mixes the sound signal Se and the sound signal Sv (here, Fr(S)×Sv), which has been received by the microphone 51 and includes reverberation and to which the reverb filter has been applied, to generate a sound signal Sm of mixed sound.

In step S37, the actuator controlling section 75 controls the actuator 53 to vibrate on the basis of the sound signal Sm of the mixed sound. As a result, the mixed sound in which the sound to which the reverberation according to the distance coefficient K is added and the background sound are mixed is outputted to the space Sb from the partition section 31 including the light controlling glass 52 connected to the actuator 53.

In step S38, the transmittance determination section 72 arithmetically operates the abovementioned expression (1) on the basis of the distance coefficient K to determine transmittance Kt and outputs the determined transmittance Kt to the light controlling section 73.

In step S39, the light controlling section 73 controls the transmittance of the light controlling glass 52 on the basis of the determined transmittance Kt.

By the processes described above, it becomes possible to interlock the visual shielding property and the auditory shielding property with each other in regard to a manner of the person H1 in the space Sa through the partition section 31 in response to the distance from the person H2 in the space Sb to the partition section 31, and, by a change of reverberation generated by the reverb filter 91, it becomes possible to cause recognition of such spread of space as if the space Sb and the space Sa are connected to each other.

<6. Example Executed by Software>

Incidentally, while the series of processes described above can be executed by hardware, it is also possible to execute the same by software. In a case where the series of processes is executed by software, a program that constructs the software is installed from a recording medium into a computer incorporated in hardware for exclusive use or, for example, a personal computer for universal use that can execute various functions by installing various programs.

Figure 8:
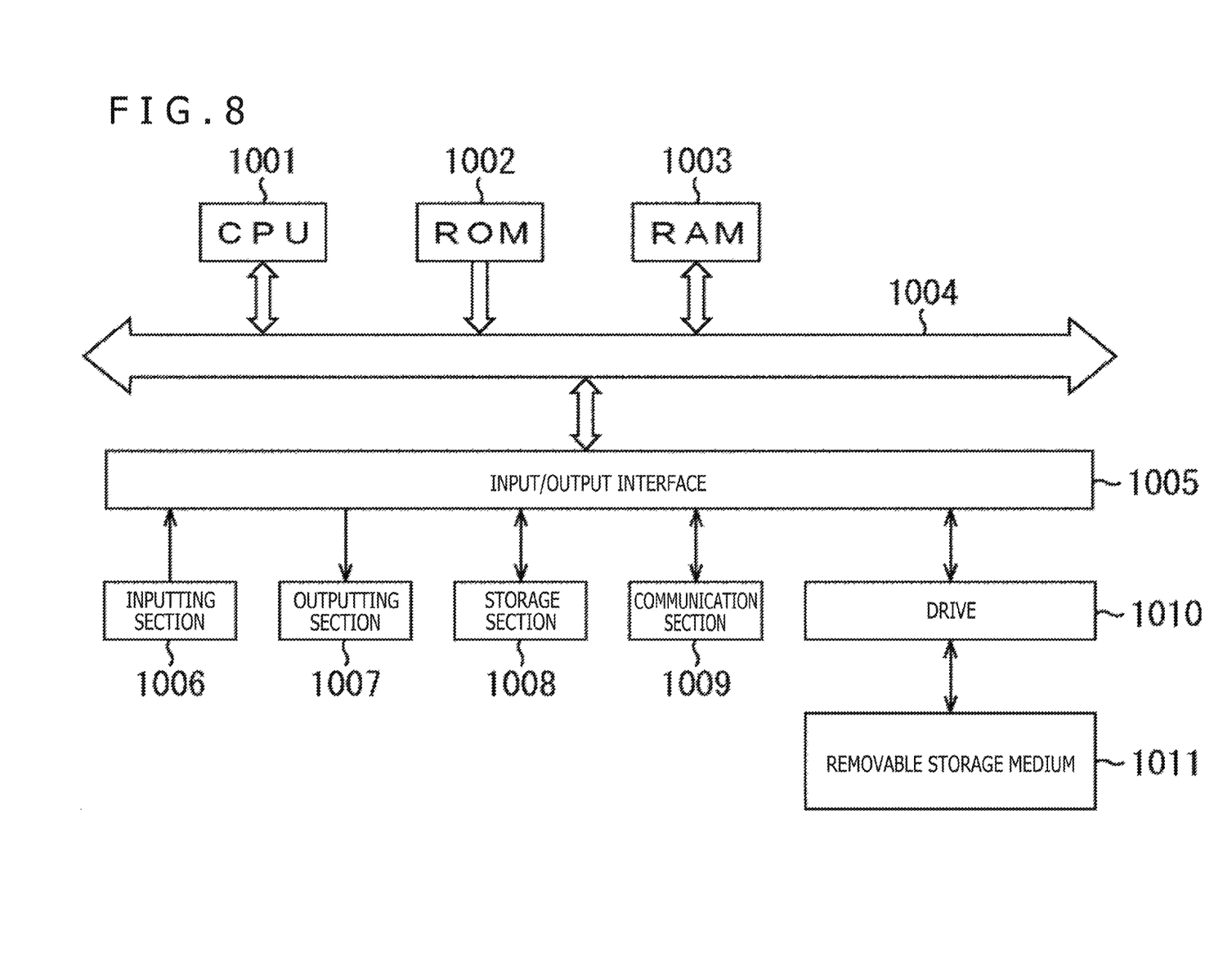
FIG. 8 is a view illustrating an example of a configuration of a personal computer for universal use.

FIG. 8 depicts an example of a configuration of a personal computer for universal use. This personal computer has a CPU (Central Processing Unit) 1001 built therein. To the CPU 1001, an input/output interface 1005 is connected by a bus 1004. To the bus 1004, a ROM (Read Only Memory) 1002 and a ROM (Random Access Memory) 1003 are connected.

To the input/output interface 1005, an inputting section 1006 including inputting devices such as a keyboard and a mouse that allow a user to input an operation command, an outputting section 1007 that outputs to a display device a processing operation screen image or an image of a result of processing, a storage section 1008 including a hard disk drive or the like for storing a program and various data, and a communication section 1009 that includes a LAN (Local Area Network) adapter or the like and executes a communication process through a network represented by the Internet are connected. Further, to the input/output interface 1005, a drive 1010, which reads and writes data from and into a removable medium 1011 such as a magnetic disk (including a flexible disk), an optical disk (including a CD-ROM (Compact Disc-Read Only Memory) and a DVD (Digital Versatile Disc)), a magneto-optical disk (including an MD (Mini Disc)) or a semiconductor memory, is connected.

The CPU 1001 executes various processes in accordance with a program stored in the ROM 1002 or a program read out from the removable medium 1011 such as a magnetic disk, an optical disk, a magneto-optical disk or a semiconductor memory, installed in the storage section 1008 and loaded from the storage section 1008 into the RAM 1003. Into the RAM 1003, data and so forth necessary for the CPU 1001 to execute various processes are also stored suitably.

In a computer configured in such a manner as described above, the CPU 1001 loads a program stored, for example, in the storage section 1008 into the RAM 1003 through the input/output interface 1005 and the bus 1004 and executes the program to perform the series of processes described above.

The program to be executed by the computer (CPU 1001) can be recorded into and provided as the removable medium 1011, for example, as a package medium. Further, the program can be provided through a wired or wireless transmission medium such as a local area network, the Internet or a digital satellite broadcast.

In the computer, the program can be installed into the storage section 1008 through the input/output interface 1005 by loading the removable medium 1011 into the drive 1010. Further, the program can be received by the communication section 1009 through a wired or wireless transmission medium and installed into the storage section 1008. Further, the program can be installed into the ROM 1002 or the storage section 1008 in advance.

It is to be noted that the program executed by the computer may be a program by which the processes are performed in time series in accordance with the order described in the present specification or may be a program in which the processes are performed in parallel or are performed at necessary timings such as when they are called.

It is to be noted that the control section 55 depicted in FIGS. 2 and 6 corresponds to the personal computer of FIG. 8.

Further, in the present specification, the term system signifies a set of a plurality of components (devices, modules (parts) and so forth) irrespective of whether or not all of the components are included in the same housing. Accordingly, a plurality of devices accommodated in separate housings and connected to each other through a network, and a single device including a plurality of modules accommodated in a single housing individually are both a system.

It is to be noted that the embodiment of the present disclosure is not limited to the embodiment described hereinabove and can be altered in various manners without departing from the subject matter of the present disclosure.

For example, the present disclosure can assume a configuration for cloud computing in which one function is shared by a plurality of apparatuses through a network and is processed cooperatively by them.

Further, the steps described hereinabove with reference to the flow charts can be executed by a single apparatus and can be shared and executed by a plurality of apparatus.

Furthermore, in a case where a plurality of processes is included in one step, the plurality of processes included in the one step can be executed by a single apparatus and can be shared and executed by a plurality of apparatuses.

It is to be noted that the present disclosure can also take such configurations as described below.

<1> An information processing apparatus, including:
a distance measurement section that measures a distance between a person in a second space and a partition, in which a first space and the second space are partitioned by the partition; and
a control section that controls visual and auditory shielding properties of the partition in response to the distance measured by the distance measurement section.

<2> The information processing apparatus according to <1> in which
the control section includes:
a transmittance controlling section that controls light transmittance of the partition in response to the distance measured by the distance measurement section; and
an audio controlling section that controls audio to output audio in the first space to the second space in response to the distance measured by the distance measurement section.

<3> The information processing apparatus according to <2> in which
the partition includes light controlling glass;
the information processing apparatus further includes an actuator that is configured so as to be connected to the partition and vibrates the partition to output audio;
the control section sets a distance coefficient in response to the distance measured by the distance measurement section;
the transmittance controlling section controls, in response to the distance coefficient, light transmittance of the light controlling glass that configures the partition; and the audio controlling section vibrates the partition through the actuator in response to the distance coefficient to output audio in the first space to the second space.

<4> The information processing apparatus according to <3> in which the control section controls the distance coefficient to 1 where the distance measured by the distance measurement section is shorter than a first distance, sets the distance coefficient to a value between 0 and 1 in response to the distance where the distance measured by the distance measurement section is an intermediate distance between a second distance longer than the first distance and the first distance, and sets the distance coefficient to 0 where the distance measured by the distance measurement section is longer than the second distance.

<5> The information processing apparatus according to <3> in which the transmittance controlling section controls, by a value obtained by multiplying a predetermined transmittance by the distance coefficient, light transmittance of the light controlling glass that configures the partition.

<6> The information processing apparatus according to <3> further including:

a microphone that receives audio in the first space and outputs the audio as an audio signal; and a storage section that stores an audio signal including background sound; in which the audio controlling section sets an audio mixing ratio in response to the distance coefficient, mixes an audio signal of audio in the first space received by the microphone and an audio signal including the background sound with each other with the audio mixing ratio to generate an audio signal including mixed audio, and controls the partition to vibrate on the basis of the audio signal of the mixed audio to output the mixed audio to the second space.

<7> The information processing apparatus according to <6> in which the audio controlling section mixes the audio signal of the audio in the first space received by the microphone and the audio signal including the background sound with each other on the basis of the audio mixing ratio to generate an audio signal including mixed audio, and controls the partition to vibrate on the basis of the audio signal of the mixed audio to output the mixed audio to the second space.

<8> The information processing apparatus according to <7> in which the audio controlling section controls, when the audio mixing ratio is lower than a predetermined value, the actuator to generate vibration of an opposite phase corresponding to the audio signal of the mixed audio and controls, when the audio mixing ratio is higher than the predetermined value, the actuator to generate vibration of a same phase corresponding to the audio signal of the mixed audio.

<9> The information processing apparatus according to any one of <6> to <8> in which the background sound is silence.

<10> The information processing apparatus according to any one of <6> to <9> further including:

a reverb filter that adds reverberation in response to the distance coefficient to the audio signal of the audio received by the microphone.

<11> The information processing apparatus according to <10> in which the reverb filter mixes, by a sum product according to the distance coefficient, a processing result by a filter that adds reverberation according to the first space to the audio signal of the audio received by the microphone and a processing result by a filter that adds reverberation according to a space including both the first space and the second space to the audio signal of the audio received by the microphone, to add reverberation in response to the distance coefficient to the audio signal of the audio received by the microphone.

<12> An information processing method that is a control method for an information processing apparatus including a distance measurement section that measures a distance between a person in a second space and a partition, in which a first space and the second space are partitioned by the partition, the information processing method including: a controlling process for controlling visual and auditory shielding properties of the partition in response to the distance measured by the distance measurement section.

<13> A program for causing a computer to execute process including:

a distance measurement process for measuring a distance between a person in a second space and a partition, in which a first space and the second space are partitioned by the partition; and a controlling process for controlling visual and auditory shielding properties of the partition in response to the distance measured by the distance measurement section.

REFERENCE SIGNS LIST

11 Information processing apparatus, 31 Partition section, 32 Pedestal section, 51 Microphone, 52 Light controlling glass, 53 Actuator, 54 Distance measurement sensor, 55 Control section, 71 Distance coefficient setting section, 72 Transmittance determination section, 73 Light controlling section, 74 Sound mixing ratio determination section, 75 Actuator controlling section, 76 ALC, 77 Storage section, 91 Reverb filter

The invention claimed is:

1. An information processing apparatus, comprising:
a distance measurement section configured to measure a distance between a person in a second space and a partition, wherein
the partition includes a light controlling glass, and
a first space and the second space are partitioned by the partition; and
a control section configured to control a visual shielding property of the partition and an audio shielding property of the partition based on the distance measured by the distance measurement section,
wherein the control section includes a transmittance controlling section configured to control light transmittance of the partition based on the measured distance, for the control of the visual shielding property of the partition.

2. The information processing apparatus according to claim 1, wherein
the control section further includes
an audio controlling section configured to control an output audio, with respect to an audio received from the first space, in the second space based on the distance measured by the distance measurement section.

3. The information processing apparatus according to claim 2, wherein
the information processing apparatus further includes an actuator configured to connect to the partition,
the actuator is further configured to vibrate the partition based on the output audio;

the control section is further configured to set a distance coefficient based on the distance measured by the distance measurement section;

the transmittance controlling section is further configured to control, based on the distance coefficient, light transmittance of the light controlling glass that configures the partition; and the audio controlling section is further configured to vibrate the partition via the actuator based on the distance coefficient to output the output audio in the second space.

4. The information processing apparatus according to claim 3, wherein the control section is further configured to:
set the distance coefficient to 1 based on the distance, measured by the distance measurement section, shorter than a first distance,
set the distance coefficient to a value between 0 and 1 based on the distance, measured by the distance measurement section, greater than the first distance and shorter than a second distance,
wherein the second distance is longer than the first distance, and
set the distance coefficient to 0 based on the distance, measured by the distance measurement section, longer than the second distance.

5. The information processing apparatus according to claim 3, wherein the transmittance controlling section is further configured to control the light transmittance of the light controlling glass based on a value obtained by multiplication of a specific transmittance and the distance coefficient.

6. The information processing apparatus according to claim 3, further comprising:

a microphone configured to:
receive the audio as a first audio signal from the first space, and
output the output audio in the second space; and
a storage section configured to store a second audio signal including background sound, wherein
the audio controlling section is further configured to:
set an audio mixing ratio based on the distance coefficient,
mix the first and the second audio signal based on the audio mixing ratio to generate the output audio, and
control the partition to vibrate based on output audio.

7. The information processing apparatus according to claim 6, wherein the audio controlling section is further configured to:
control, when the audio mixing ratio is lower than a specific value, the actuator to generate vibration of an opposite phase corresponding to the output audio, and
control, when the audio mixing ratio is higher than the specific value, the actuator to generate vibration of a same phase corresponding to the output audio.

8. The information processing apparatus according to claim 6, wherein the background sound is silence.

9. The information processing apparatus according to claim 6, further including a reverb filter configured to add reverberation, based on the distance coefficient, to the first audio signal of the audio received by the microphone.

10. The information processing apparatus according to claim 9, wherein the reverb filter is further configured to:

mix a first processing result and a second processing result to add reverberation based on the distance coefficient to the first audio signal of the audio received by the microphone, wherein
the first processing result is from a first filter configured to add reverberation based the first space to the first audio signal of the audio received by the microphone, and
the second processing result is from a second filter configured to add reverberation based on a space including both the first space and the second space to the first audio signal of the audio received by the microphone.

11. An information processing method, comprising:

measuring a distance between a person in a second space and a partition, wherein
the partition includes a light controlling glass, and
a first space and the second space are partitioned by the partition; and
controlling a visual shielding property of the partition and an audio shielding property of the partition based on the measured distance,
wherein light transmittance of the partition is controlled based on the measured distance, to control the visual shielding property of the partition.

12. A non-transitory computer-readable medium having stored thereon computer-executable instructions which, when executed by a processor, cause the processor to execute operations, the operations comprising:

measuring a distance between a person in a second space and a partition, wherein
the partition includes a light controlling glass, and
a first space and the second space are partitioned by the partition; and
controlling a visual shielding property of the partition and an audio shielding property of the partition based on the measured distance,
wherein light transmittance of the partition is controlled based on the measured distance, to control the visual shielding property of the partition.

* * * * *